(12) United States Patent
Chakraborty et al.

(10) Patent No.: US 11,983,191 B2
(45) Date of Patent: May 14, 2024

(54) METHOD AND SYSTEM FOR FACILITATING DATA INTERCHANGE

(71) Applicant: JPMorgan Chase Bank, N.A., New York, NY (US)

(72) Inventors: Samip Chakraborty, Bangalore (IN); Jooi-Teong Chuah, East Brunswick, NJ (US); Wooyong Ee, Frisco, TX (US); Praveen Pathiyil, Bengaluru (IN); Anand Sharma, Bengaluru (IN); Waseem Manzoor, Little Elm, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 354 days.

(21) Appl. No.: 17/444,218

(22) Filed: Aug. 2, 2021

(65) Prior Publication Data
US 2022/0405107 A1    Dec. 22, 2022

(30) Foreign Application Priority Data

Jun. 18, 2021   (IN) .............................. 202111027339

(51) Int. Cl.
*G06F 7/00* (2006.01)
*G06F 9/445* (2018.01)
*G06F 9/451* (2018.01)
*G06F 9/54* (2006.01)
*G06F 16/25* (2019.01)

(52) U.S. Cl.
CPC ........ *G06F 16/258* (2019.01); *G06F 9/44505* (2013.01); *G06F 9/451* (2018.02); *G06F 9/541* (2013.01)

(58) Field of Classification Search
CPC .... G06F 16/258; G06F 9/451; G06F 9/44505; G06F 9/541
USPC .................................................. 707/600–899
See application file for complete search history.

(56) References Cited

U.S. PATENT DOCUMENTS

2014/0200988 A1*   7/2014   Kassko .............. G06Q 30/0242
                                                                705/14.41

* cited by examiner

*Primary Examiner* — Isaac M Woo
(74) *Attorney, Agent, or Firm* — Greenblum & Bernstein, P.L.C.

(57) ABSTRACT

A method for facilitating serialized data interchange and access via an application programming interface is provided. The method includes retrieving a data set from a networked repository, the data set including information in a multidimensional data structure; mapping the data set to a predetermined file format; generating a standardized data set based on a result of the mapping, the standardized data set corresponding to the predetermined file format; persisting the standardized data set in the networked repository; and exposing the standardized data set in the networked repository via the application programming interface.

18 Claims, 6 Drawing Sheets

METHOD AND SYSTEM FOR FACILITATING DATA INTERCHANGE

CROSS-REFERENCE TO RELATED APPLICATIONS

This application claims the benefit of Indian Provisional Patent Application No. 202111027339, filed Jun. 18, 2021, which is hereby incorporated by reference in its entirety.

BACKGROUND

1. Field of the Disclosure

This technology generally relates to methods and systems for data interchange, and more particularly to methods and systems for serializing multidimensional data structures to facilitate interchange and access of features data via an application programming interface.

2. Background Information

Many business entities rely on a centralized repository such as, for example, a data lake to provide data for machine learning consumption. The centralized repository stores large quantities of structured as well as unstructured data that must be directly accessed and manipulated to enable various machine learning functions. Historically, the serialization and storage of multidimensional data structures in the centralized repository for use in machine learning and artificial intelligence are not conducive to data mobility and user serviceability.

One drawback of using conventional serialization and storage techniques for multidimensional data structures is that in many instances, resultant data are not easily accessible via application programming interface (API) protocols such as, for example, a hypertext transfer protocol (HTTP). As a result, effective use of information in the multidimensional data structures requires user expertise and large investments of time. Additionally, due to the individualized solutions required to consume the multidimensional data structures, the resultant data are often difficult to track and review.

Therefore, there is a need for a novel adapter pattern to serialize and store multidimensional data structures to facilitate interchange and access of feature files via an application programming interface.

SUMMARY

The present disclosure, through one or more of its various aspects, embodiments, and/or specific features or sub-components, provides, inter alia, various systems, servers, devices, methods, media, programs, and platforms for serializing multidimensional data structures to facilitate interchange and access of features data via an application programming interface.

According to an aspect of the present disclosure, a method for facilitating serialized data interchange and access via an application programming interface is provided. The method is implemented by at least one processor. The method may include retrieving at least one data set from a networked repository, the at least one data set may include information in a multidimensional data structure; mapping the at least one data set to at least one predetermined file format; generating at least one standardized data set based on a result of the mapping, the at least one standardized data set may correspond to the at least one predetermined file format; persisting the at least one standardized data set in the networked repository; and exposing the at least one standardized data set in the networked repository via the application programming interface.

In accordance with an exemplary embodiment, the at least one data set may relate to at least one from among time-series based numerical data and sequence based numerical data.

In accordance with an exemplary embodiment, the at least one predetermined file format may include at least one from among an open standard file format and a data interchange file format that uses human-readable text to store and transmit data objects.

In accordance with an exemplary embodiment, the at least one standardized data set may be exposed for consumption by a data reservoir application, the data reservoir application may include a telemetry data service provider application that organizes information in the at least one standardized data set into at least one collection of related data.

In accordance with an exemplary embodiment, the method may further include receiving at least one previously generated standardized data set; persisting the at least one previously generated standardized data set in the networked repository; receiving at least one request that relates to the transformation of the previously generated standardized data set into a corresponding multidimensional data set; and generating the corresponding multidimensional data set in response to the at least one request.

In accordance with an exemplary embodiment, the method may further include retrieving, via a communication interface, at least one raw data set from at least one source, the at least one source may include at least one from among a stream source and a batch source; retrieving, via the communication interface, at least one predetermined configuration; determining at least one feature value from the at least one raw data set based on the at least one predetermined configuration; and persisting the determined at least one feature value as the at least one data set in the networked repository.

In accordance with an exemplary embodiment, the at least one predetermined configuration may include at least one definition from a feature registry.

In accordance with an exemplary embodiment, the at least one feature value may be determined in real-time based on the retrieved at least one raw data set.

In accordance with an exemplary embodiment, the method may further include indexing the at least one standardized data set in the networked repository; and categorizing the indexed at least one standardized data set based on at least one characteristic.

In accordance with an exemplary embodiment, the categorized at least one standardized data set may include human-readable text that is searchable via at least one graphical user interface.

According to an aspect of the present disclosure, a computing device configured to implement an execution of a method for facilitating serialized data interchange and access via an application programming interface is disclosed. The computing device comprising a processor; a memory; and a communication interface coupled to each of the processor and the memory, wherein the processor may be configured to retrieve at least one data set from a networked repository, the at least one data set may include information in a multidimensional data structure; map the at least one data set to at least one predetermined file format; generate at least one standardized data set based on a result of the mapping, the at least one standardized data set may correspond to the at least one predetermined file format; persist the at least one standardized data set in the networked repository; and expose the at least one standardized data set in the networked repository via the application programming interface.

In accordance with an exemplary embodiment, the at least one data set may relate to at least one from among time-series based numerical data and sequence based numerical data.

In accordance with an exemplary embodiment, the at least one predetermined file format may include at least one from among an open standard file format and a data interchange file format that uses human-readable text to store and transmit data objects.

In accordance with an exemplary embodiment, the processor may be further configured to expose the at least one standardized data set for consumption by a data reservoir application, the data reservoir application may include a telemetry data service provider application that organizes information in the at least one standardized data set into at least one collection of related data.

In accordance with an exemplary embodiment, the processor may be further configured to receive at least one previously generated standardized data set; persist the at least one previously generated standardized data set in the networked repository; receive at least one request that relates to the transformation of the previously generated standardized data set into a corresponding multidimensional data set; and generate the corresponding multidimensional data set in response to the at least one request.

In accordance with an exemplary embodiment, the processor may be further configured to retrieve, via the communication interface, at least one raw data set from at least one source, the at least one source may include at least one from among a stream source and a batch source; retrieve, via the communication interface, at least one predetermined configuration; determine at least one feature value from the at least one raw data set based on the at least one predetermined configuration; and persist the determined at least one feature value as the at least one data set in the networked repository.

In accordance with an exemplary embodiment, the at least one predetermined configuration may include at least one definition from a feature registry.

In accordance with an exemplary embodiment, the processor may be further configured to determine the at least one feature value in real-time based on the retrieved at least one raw data set.

In accordance with an exemplary embodiment, the processor may be further configured to index the at least one standardized data set in the networked repository; and categorize the indexed at least one standardized data set based on at least one characteristic.

In accordance with an exemplary embodiment, the categorized at least one standardized data set may include human-readable text that is searchable via at least one graphical user interface.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
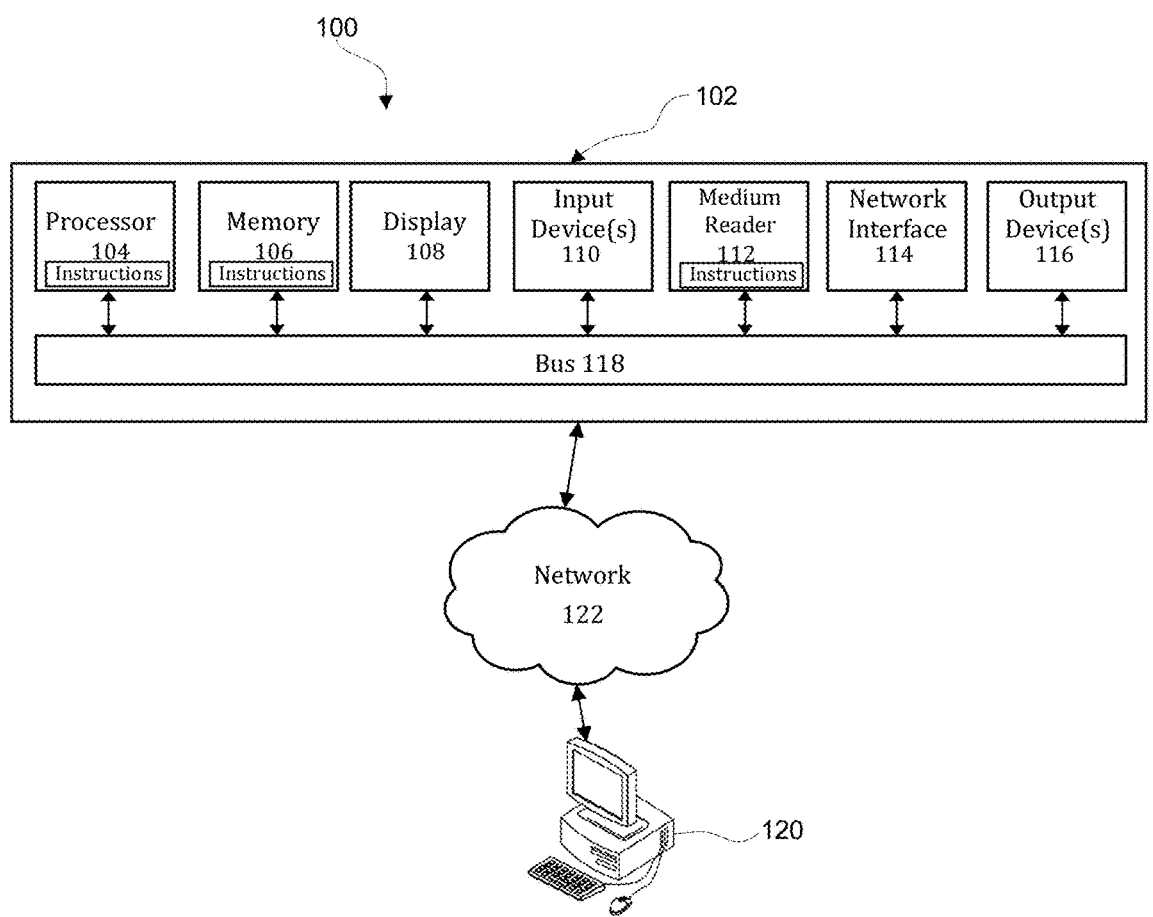
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for serializing multidimensional data structures to facilitate interchange and access of features data via an application programming interface.

Figure 2:
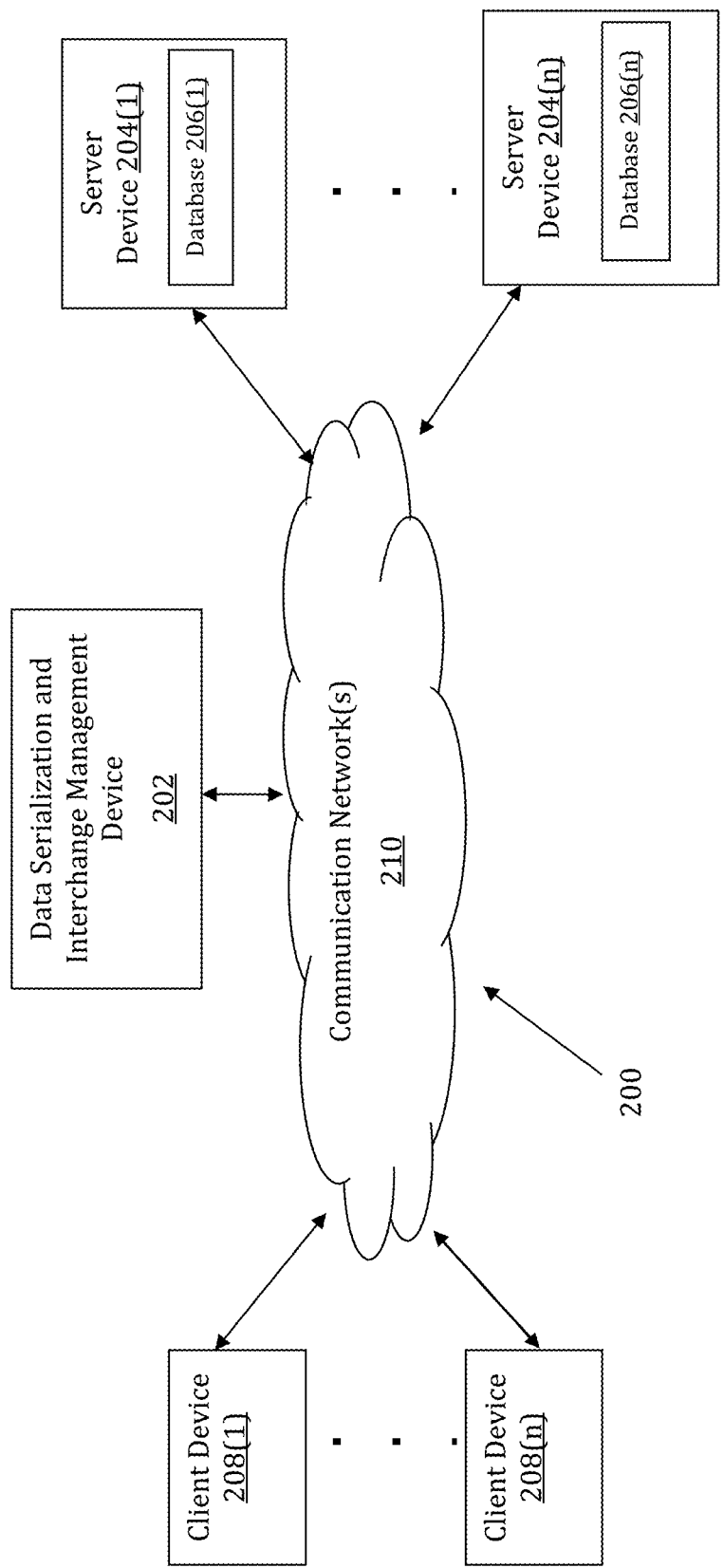
FIG. 2 illustrates an exemplary diagram of a network environment.

Referring to FIG. 2, a schematic of an exemplary network environment 200 for implementing a method for serializing multidimensional data structures to facilitate interchange and access of features data via an application programming interface is illustrated. In an exemplary embodiment, the method is executable on any networked computer platform, such as, for example, a personal computer (PC).

The method for serializing multidimensional data structures to facilitate interchange and access of features data via an application programming interface may be implemented by a Data Serialization and Interchange Management (DSIM) device 202. The DSIM device 202 may be the same or similar to the computer system 102 as described with respect to FIG. 1. The DSIM device 202 may store one or more applications that can include executable instructions that, when executed by the DSIM device 202, cause the DSIM device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the DSIM device 202 itself, may be located in virtual server(s) running in a cloud-based computing environment rather than being tied to one or more specific physical network computing devices. Also, the application(s) may be running in one or more virtual machines (VMs) executing on the DSIM device 202. Additionally, in one or more embodiments of this technology, virtual machine(s) running on the DSIM device 202 may be managed or supervised by a hypervisor.

In the network environment 200 of FIG. 2, the DSIM device 202 is coupled to a plurality of server devices 204(1)-204(n) that hosts a plurality of databases 206(1)-206(n), and also to a plurality of client devices 208(1)-208(n) via communication network(s) 210. A communication interface of the DSIM device 202, such as the network interface 114 of the computer system 102 of FIG. 1, operatively couples and communicates between the DSIM device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the DSIM device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and DSIM devices that efficiently implement a method for serializing multidimensional data structures to facilitate interchange and access of features data via an application programming interface.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The DSIM device 202 may be a standalone device or integrated with one or more other devices or apparatuses, such as one or more of the server devices 204(1)-204(n), for example. In one particular example, the DSIM device 202 may include or be hosted by one of the server devices 204(1)-204(n), and other arrangements are also possible. Moreover, one or more of the devices of the DSIM device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the DSIM device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to raw data sets, structured data sets, standardized data sets, multidimensional data structure, mapping data, open standard file formats, data interchange file formats, time-series based numerical data, and sequence based numerical data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the DSIM device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the DSIM device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the DSIM device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the DSIM device 202, the server devices 204(1)-204(n), or the client devices 208(1)-208(n), for example, may be configured to operate as virtual instances on the same physical machine. In other words, one or more of the DSIM device 202, the server devices 204(1)-204(n), or the client devices 208(1)-208(n) may operate on the same physical device rather than as separate devices communicating through communication network(s) 210. Additionally, there may be more or fewer DSIM devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
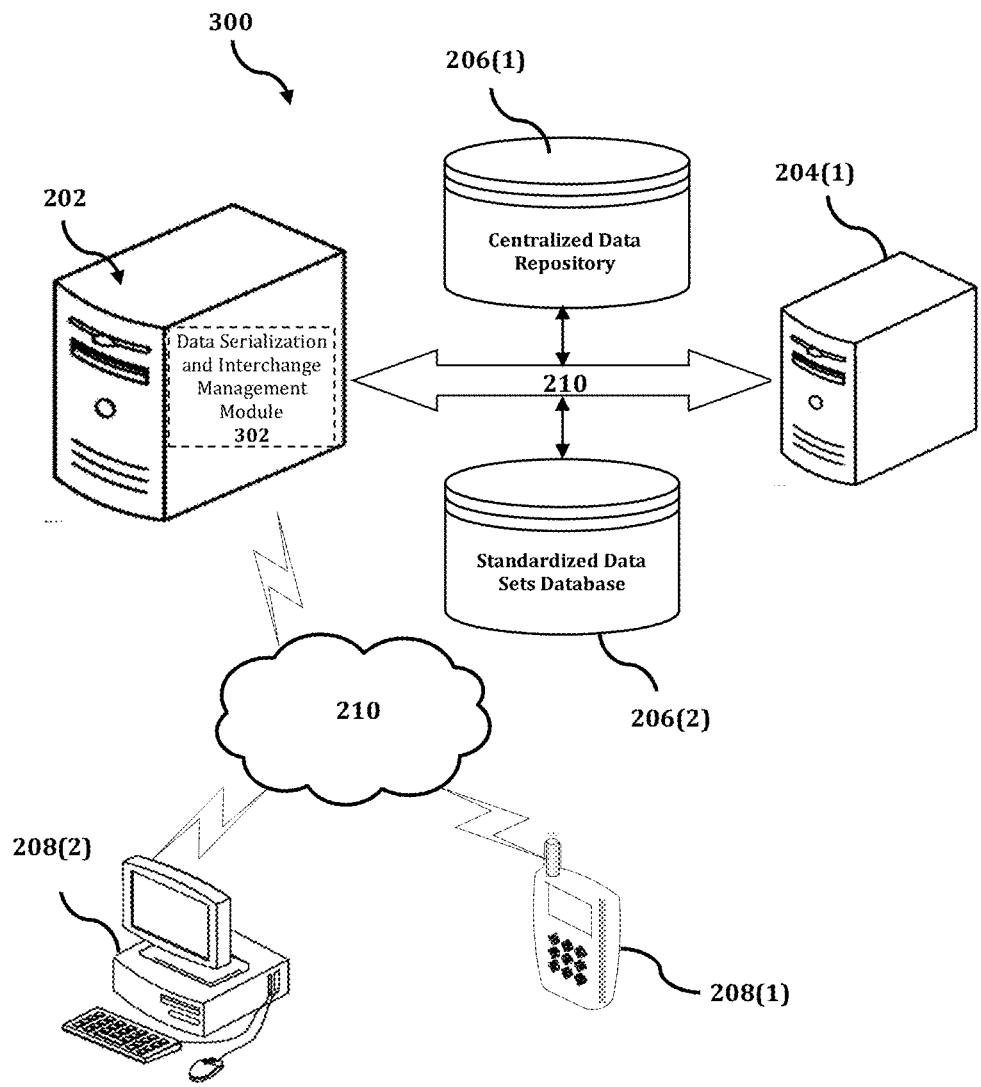
FIG. 3 shows an exemplary system for implementing a method for serializing multidimensional data structures to facilitate interchange and access of features data via an application programming interface.

The DSIM device 202 is described and shown in FIG. 3 as including a data serialization and interchange management module 302, although it may include other rules, policies, modules, databases, or applications, for example. As will be described below, the data serialization and interchange management module 302 is configured to implement a method for serializing multidimensional data structures to facilitate interchange and access of features data via an application programming interface.

An exemplary process 300 for implementing a mechanism for serializing multidimensional data structures to facilitate interchange and access of features data via an application programming interface by utilizing the network environment of FIG. 2 is shown as being executed in FIG. 3. Specifically, a first client device 208(1) and a second client device 208(2) are illustrated as being in communication with DSIM device 202. In this regard, the first client device 208(1) and the second client device 208(2) may be "clients" of the DSIM device 202 and are described herein as such. Nevertheless, it is to be known and understood that the first client device 208(1) and/or the second client device 208(2) need not necessarily be "clients" of the DSIM device 202, or any entity described in association therewith herein. Any additional or alternative relationship may exist between either or both of the first client device 208(1) and the second client device 208(2) and the DSIM device 202, or no relationship may exist.

Further, DSIM device 202 is illustrated as being able to access a centralized data repository 206(1) and a standardized data sets database 206(2). The data serialization and interchange management module 302 may be configured to access these databases for implementing a method for serializing multidimensional data structures to facilitate interchange and access of features data via an application programming interface.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the DSIM device 202 via broadband or cellular communication. Of course, these embodiments are merely exemplary and are not limiting or exhaustive.

Upon being started, the data serialization and interchange management module 302 executes a process for serializing multidimensional data structures to facilitate interchange and access of features data via an application programming interface. An exemplary process for serializing multidimensional data structures to facilitate interchange and access of features data via an application programming interface is generally indicated at flowchart 400 in FIG. 4.

Figure 4:
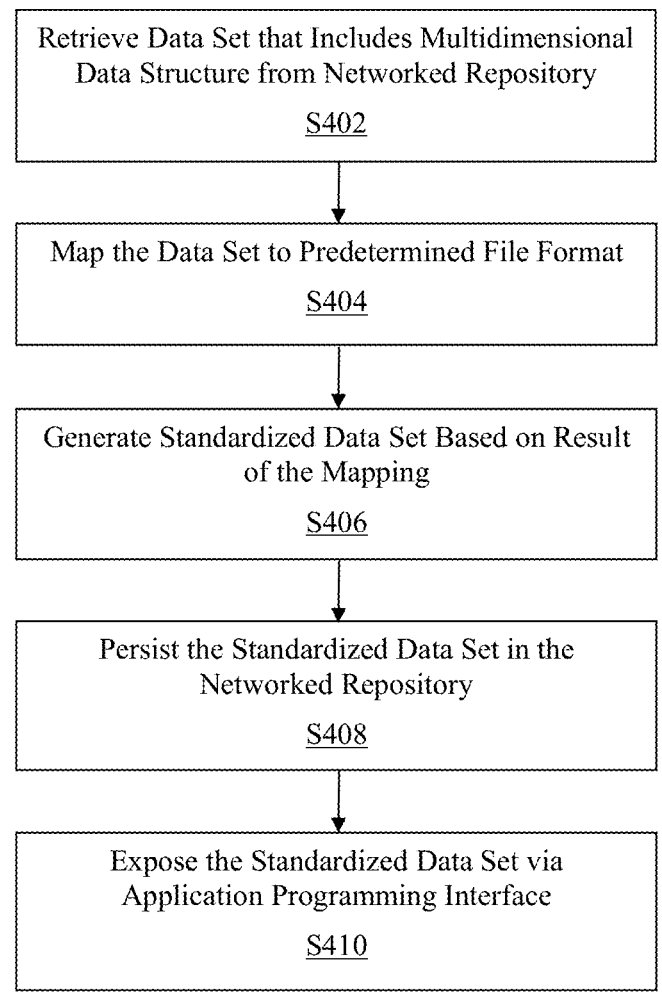
FIG. 4 is a flowchart of an exemplary process for implementing a method for serializing multidimensional data structures to facilitate interchange and access of features data via an application programming interface.

In the process 400 of FIG. 4, at step S402, a data set may be retrieved from a networked repository. The data set may relate to at least one from among time-series based numerical data and sequence based numerical data. In an exemplary embodiment, the data set may be retrieved based on an input that is received via a graphical user interface. For example, the data set may be retrieved as needed by a user based on the user's input in the graphical user interface. In another exemplary embodiment, the data set may be automatically retrieved based on a predetermined configuration such as, for example, a time period and a change state. For example, the user may initiate the predetermined configuration which causes a processor to automatically retrieve the data set when the predetermined configuration is satisfied.

In another exemplary embodiment, the data set may include information in a multidimensional data structure. For example, the multidimensional data structure may relate to numerical multidimensional data in binary form that may be used in high performance computation applications such as machine learning. The multidimensional data structures may include comparison-based data structures such as, for example, a k-d trees structure, a quadtrees structure, and a range trees structure. In another exemplary embodiment, the multidimensional data structure may utilize a multidimensional data model to facilitate the storing of information. The multidimensional data model may be composed of at least one from among a logical cube, a measure, a dimension, a hierarchy, a level, and an attribute.

In another exemplary embodiment, the logical cube may enable the organizing of measures that have the same dimensions. Measures in the same cube may have the same relationships as other logical objects in the cube and may be analyzed and displayed together. In another exemplary embodiment, the measure may populate the cells of a logical cube with collected facts. Measures may be organized by dimensions such as, for example, a time dimension. In another exemplary embodiment, the dimension may contain a set of unique values that identify and categorize data. The dimensions may form the edges of the logical cube and in turn, form the edges of the measures within the cube.

In another exemplary embodiment, the hierarchy may include a method for organizing data at different levels of aggregation. Dimensional hierarchies may be utilized to recognize trends at a particular level as well as to identify a reason for the trends by examining lower levels that correspond to the particular level. In another exemplary embodiment, the level may represent a position in the hierarchy. Each of the levels may contain aggregate values for the levels below it. In another exemplary embodiment, the attribute may provide additional information about the stored data. Attributes such as, for example, the time attribute may provide information about the time dimension to identify the last day in each time period.

In another exemplary embodiment, the networked repository may include a centralized repository such as, for example, a data lake that enables the persisting of structured and unstructured data at any scale. The centralized repository may store data as-is, without having to first structure the data, as well as run different types of analytics such as, for example, a dashboard analytic, a visualization analytic, a big data processing analytic, a real-time analytic, and a machine learning analytic. In another exemplary embodiment, the networked repository may include a curated repository such as, for example, a data reservoir that enables the persisting of structured data. The networked repository may include an internal data store such as, for example, an internal data lake that is associated with the data serialization and interchange management module 302 as well as an external data store such as, for example, an external data lake that is associated with another module.

At step S404, the data set may be mapped to a predetermined file format. In an exemplary embodiment, mapping of data may include a process of creating data element mappings between two distinct data models. The data set may be mapped by using a methodology such as, for example, hand-coded mapping, data driven mapping, and semantic mapping.

In another exemplary embodiment, the predetermined file format may include at least one from among an open standard file format and a data interchange file format that uses human-readable text to store and transmit data objects. For example, the predetermined file format may include a JavaScript Object Notation (JSON) file format that consists of serializable values such as attribute-value pairs and array data types.

In another exemplary embodiment, the predetermined file format may include data structures such as, for example, an object, an array, a value, a string, a number, and a whitespace. The object may include an unordered set of name and value pairs. The array may include an ordered collection of values. The value may include at least one from among a string value, a number value, an object value, an array value, a true value, a false value, and a null value. The string may include a sequence of at least one character such as, for example, a Unicode character. The number may correspond to a codified number that does not include the octal and hexadecimal format. The whitespace may be inserted between any pair of tokens.

At step S406, a standardized data set may be generated based on a result of the mapping. The standardized data set may correspond to the predetermined file format. In an exemplary embodiment, the standardized data set may include a structured set of data in the predetermined file format. For example, the standardized data set may include data that has been structured into the JSON file format based on the mapping. As will be appreciated by a person of ordinary skill in the art, the result of the mapping may be used to structure data in the data set based on requirements of the predetermined file format.

In another exemplary embodiment, the standardized data set may include an individual measurable property and/or characteristic such as, for example, a feature value of an observed pattern. The feature value may include informative feature values, discriminating feature values, and independent feature values. In another exemplary embodiment, the feature value may include numerical components as well as structural components such as, for example, a string component and a graph component. A set of numeric feature values may be described by a feature vector. As will be appreciated by a person of ordinary skill in the art, the feature value may be utilized in pattern recognition, pattern classification, and pattern regression that correspond to statistical analysis techniques such as, for example, a machine learning technique.

At step S408, the standardized data set may be persisted in the networked repository. In an exemplary embodiment, the standardized data set may be persisted in a machine learning specific data system such as, for example, a feature store that runs data pipelines to transform raw data into feature values. The feature store may include a feature computation and storage service that enables features to be registered, discovered, and used as part of a machine learning pipeline. The feature store may also include a feature computation and storage service that enables model inferencing by applications such as, for example, an online application. The feature store may persist large volumes of feature data as well as provide low latency access to features for the applications.

In another exemplary embodiment, the application may include at least one from among a monolithic application and a microservice application. The monolithic application may describe a single-tiered software application where the user interface and data access code are combined into a single program from a single platform. The monolithic application may be self-contained and independent from other computing applications.

In another exemplary embodiment, a microservice application may include a unique service and a unique process that communicates with other services and processes over a network to fulfill a goal. The microservice application may be independently deployable and organized around business capabilities. In another exemplary embodiment, the microservices may relate to a software development architecture such as, for example, an event-driven architecture made up of event producers and event consumers in a loosely coupled choreography. The event producer may detect or sense an event such as, for example, a significant occurrence or change in state for system hardware or software and represent the event as a message. The event message may then be transmitted to the event consumer via event channels for processing.

In another exemplary embodiment, the event-driven architecture may include a distributed data streaming platform such as, for example, an APACHE KAFKA platform for the publishing, subscribing, storing, and processing of event streams in real time. As will be appreciated by a person of ordinary skill in the art, each microservice in a microservice choreography may perform corresponding actions independently and may not require any external instructions.

In another exemplary embodiment, microservices may relate to a software development architecture such as, for example, a service-oriented architecture which arranges a complex application as a collection of coupled modular services. The modular services may include small, independently versioned, and scalable customer-focused services with specific business goals. The services may communicate with other services over standard protocols with well-defined interfaces. In another exemplary embodiment, the microservices may utilize technology-agnostic communication protocols such as, for example, a Hypertext Transfer Protocol (HTTP) to communicate over a network and may be implemented by using different programming languages, databases, hardware environments, and software environments.

At step S410, the standardized data set in the networked repository may be exposed via an application programming interface (API). In an exemplary embodiment, the standardized data set may be exposed for consumption by a data reservoir application. The data reservoir application may include a telemetry data service provider application that organizes information in the standardized data set into a collection of related data. The telemetry data may include information that relates to computer server performance and capacity monitoring metrics. In another exemplary embodiment, the standardized data set may be exposed via the API by using an application layer protocol such as, for example, a hypertext transfer protocol (HTTP) for transmitting hypermedia documents. The API may include a computing interface that defines possible interactions between software components.

In another exemplary embodiment, a raw data set may be retrieved from a source via a communication interface. The source may include at least one from among a stream source and a batch source. A predetermined configuration may also be retrieved via the communication interface. The predetermined configuration may include a definition from a feature registry. A feature value may be determined from the raw data set based on the predetermined configuration. The feature value may be determined in real-time based on the retrieved raw data set. Then, the determined feature value may be persisted with the data set in the networked repository.

In another exemplary embodiment, the standardized data set in the networked repository may be indexed to enable text searching. The indexed standardized data set may then be categorized based on a characteristic. In another exemplary embodiment, the categorized standardized data set may include human-readable text that is searchable via graphical element in a graphical user interface. For example, a user may utilize a graphical user interface to initiate a search for the standardized data set as well as for data elements within the standardized data set. As will be appreciated by a person of ordinary skill in the art, the data format of the standardized data set may enable any one from among a plurality of search engines to identify data elements within the standardized data set.

In another exemplary embodiment, a previously generated, standardized data set may be received and persisted in the networked repository. The previously generated, standardized data set may be received from at least one from among an internal source such as, for example, an internal data store as well as an external source such as, for example, an external data store. A request that relates to the transformation of the previously generated, standardized data set into a corresponding multidimensional data set may be received via an application programming interface. Then, in response to the request, the corresponding multidimensional data set may be generated consistent with embodiments in the present application. As will be appreciated by a person of ordinary skill in the art, the generation of the corresponding multidimensional data set may be a reciprocal process that relates to the generation of the standardized data from the multidimensional data set.

Figure 5:
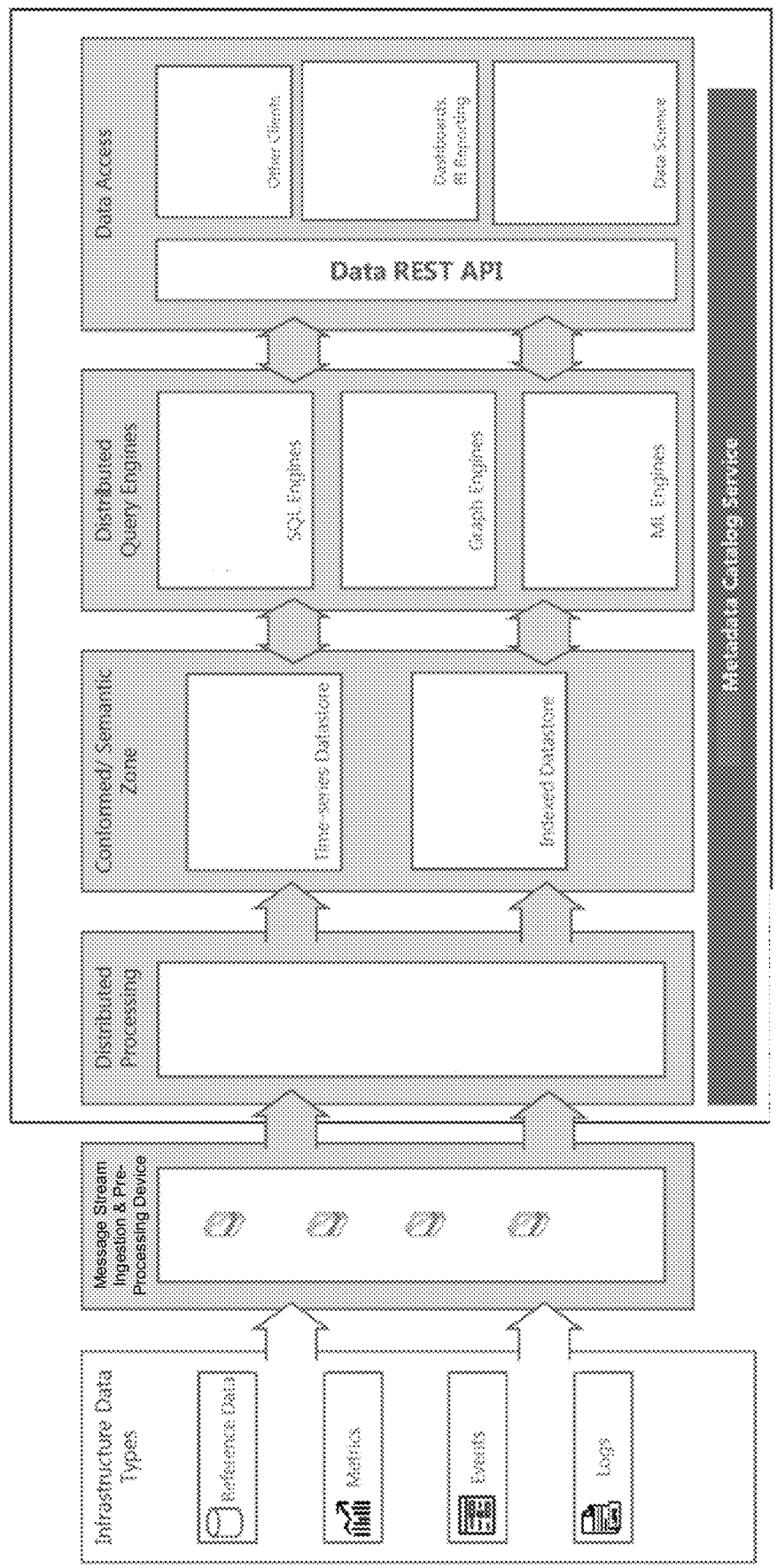
FIG. 5 is an architecture diagram that illustrates a framework that is usable for implementing a method for serializing multidimensional data structures to facilitate interchange and access of features data via an application programming interface, according to an exemplary embodiment.

FIG. 5 is an architecture diagram 500 that illustrates a framework that is usable for implementing a method for serializing multidimensional data structures to facilitate interchange and access of features data via an application programming interface, according to an exemplary embodiment. The framework of FIG. 5 represents an exemplary implementation of the disclosed data serialization and interchange management invention consistent with disclosures in the present application.

As illustrated in FIG. 5, infrastructure data types such as, for example, reference data, metric data, event data, and log data may be retrieved from a plurality of sources via a message stream ingestion and pre-processing device. The message stream ingestion and pre-processing device may include a communication system that transfers data between various computing components. The message stream ingestion and pre-processing device may then provide the ingested data to a distributed processing component. The distributed processing component may apply predetermined configurations to the ingested data and transmit the processed data to a conformed and/or semantic zone component. The conformed and/or semantic zone component may time persist the processed data into at least one from among a time-series datastore and an indexed datastore.

Next, distributed query engines such as, for example a structured query language (SQL) engine, a graph engine, and a machine learning engine may access the persisted data. The distributed query engines may further process the persisted data based on a predetermined user specification. The distributed query engines may then pass the processed data to a data access component. The data access component may utilize an application programming interface (API) such as, for example, a data representational state transfer (REST) API to enable access to the processed data for third-party clients, dashboards, data visualization, and data reporting, as well as for further processing by a data science component.

Figure 6:
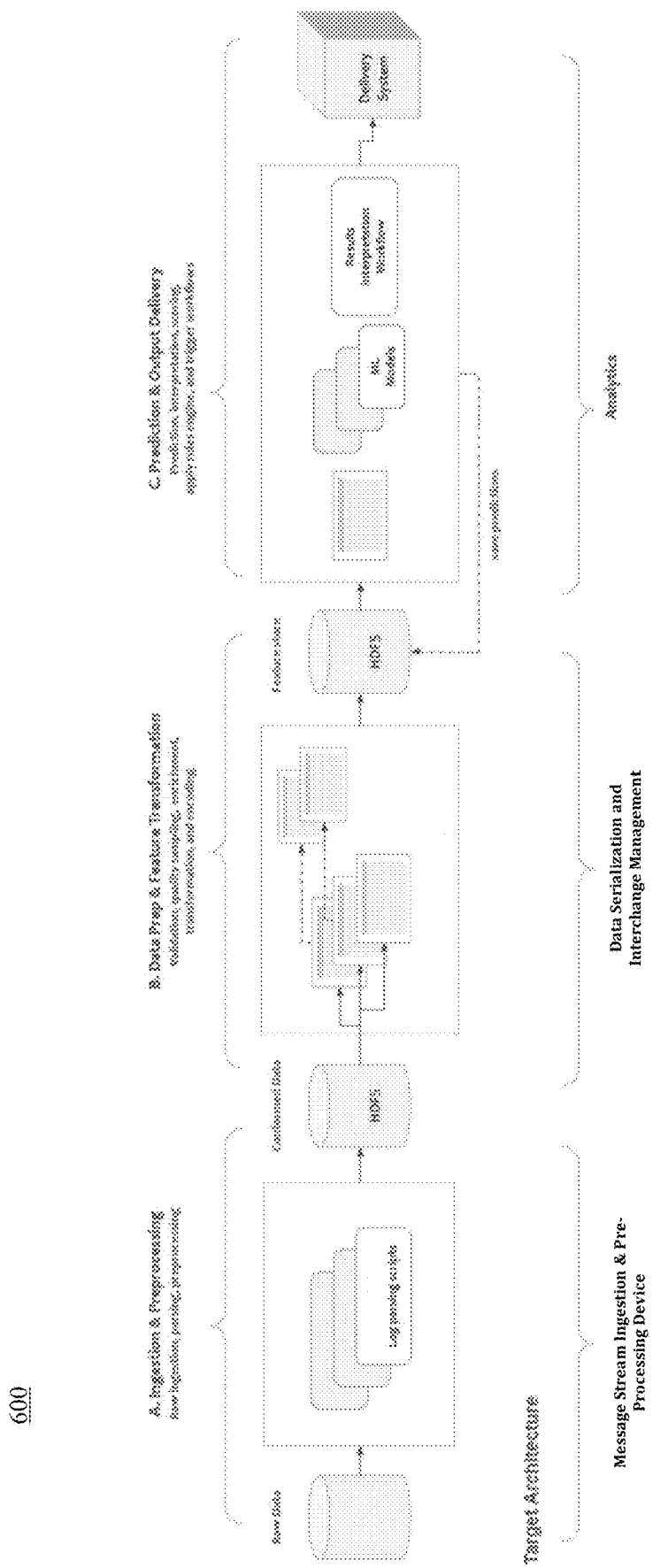
FIG. 6 is a diagram that illustrates an integrated architecture that is usable for implementing a method for serializing multidimensional data structures to facilitate interchange and access of features data via an application programming interface, according to an exemplary embodiment.

FIG. 6 is a diagram 600 that illustrates an integrated target architecture that is usable for implementing a method for serializing multidimensional data structures to facilitate interchange and access of features data via an application programming interface, according to an exemplary embodiment. FIG. 6 provides a simplified view of a common architecture pattern that is usable to implement the disclosed invention.

As illustrated in FIG. 6, the architecture is comprised of processing stages that includes an ingestion and preprocessing stage, a data preparation and feature transformation stage, as well as a prediction and output delivery stage. In the ingestion and preprocessing stage, the raw data may be ingested, parsed, and preprocessed based on a predetermined configuration. Log parsing and ingestion may be ported to a component within the message stream ingestion and preprocessing device while preprocessed topics are available for persisting.

In the data preparation and feature transformation stage, the preprocessed data may be validated, sampled for quality, enriched, further transformed, and encoded for storage in a feature store. The preprocessed and conformed data may be available for easy access via a data API. Industrialized and scheduled processing environments may be provided to perform enrichment and feature transformation. The industrialized and scheduled processing environments may enable the saving of transformed features via an abstracted feature store by leveraging integrated republishing mechanisms.

In the prediction and output delivery stage, prediction techniques and rules may be applied to the data to interpret, score, and trigger workflows that rely on the processed data. The prediction pipeline may be hosted in an enterprise analytics platform. The enterprise analytics platform may initiate a runtime to access and retrieve prepared features as well as encoded lookups to run prediction models and store prediction outputs for later use. Results interpretation and resulting workflows such as, for example, generating and sending email alerts may be hosted and triggered within the prediction and output delivery stage.

Accordingly, with this technology, an optimized process for serializing multidimensional data structures to facilitate interchange and access of features data via an application programming interface is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating serialized data interchange and access via an application programming interface, the method being implemented by at least one processor, the method comprising:
   retrieving, by the at least one processor, at least one data set from a networked repository, the at least one data set including information in a multidimensional data structure;
   mapping, by the at least one processor, the at least one data set to at least one predetermined file format;
   generating, by the at least one processor, at least one standardized data set based on a result of the mapping, the at least one standardized data set corresponding to the at least one predetermined file format;
   persisting, by the at least one processor, the at least one standardized data set in the networked repository;
   exposing, by the at least one processor, the at least one standardized data set in the networked repository via the application programming interface;
   retrieving, by the at least one processor via a communication interface, at least one raw data set from at least one source, the at least one source including at least one from among a stream source and a batch source;
   retrieving, by the at least one processor via the communication interface, at least one predetermined configuration;
   determining, by the at least one processor, at least one feature value from the at least one raw data set based on the at least one predetermined configuration; and
   persisting, by the at least one processor, the determined at least one feature value as the at least one data set in the networked repository.

2. The method of claim 1, wherein the at least one data set relates to at least one from among time-series based numerical data and sequence based numerical data.

3. The method of claim 1, wherein the at least one predetermined file format includes at least one from among an open standard file format and a data interchange file format that uses human-readable text to store and transmit data objects.

4. The method of claim 1, wherein the at least one standardized data set is exposed for consumption by a data reservoir application, the data reservoir application including a telemetry data service provider application that organizes information in the at least one standardized data set into at least one collection of related data.

5. The method of claim 1, further comprising:
   receiving, by the at least one processor, at least one previously generated standardized data set;
   persisting, by the at least one processor, the at least one previously generated standardized data set in the networked repository;
   receiving, by the at least one processor, at least one request that relates to the transformation of the previously generated standardized data set into a corresponding multidimensional data set; and
   generating, by the at least one processor, the corresponding multidimensional data set in response to the at least one request.

6. The method of claim 1, wherein the at least one predetermined configuration includes at least one definition from a feature registry.

7. The method of claim 1, wherein the at least one feature value is determined in real-time based on the retrieved at least one raw data set.

8. The method of claim 1, further comprising:
   indexing, by the at least one processor, the at least one standardized data set in the networked repository; and
   categorizing, by the at least one processor, the indexed at least one standardized data set based on at least one characteristic.

9. The method of claim 8, wherein the categorized at least one standardized data set includes human-readable text that is searchable via at least one graphical user interface.

10. A computing device configured to implement an execution of a method for facilitating serialized data interchange and access via an application programming interface, the computing device comprising:
a processor;
a memory; and
a communication interface coupled to each of the processor and the memory,
wherein the processor is configured to:
retrieve at least one data set from a networked repository, the at least one data set including information in a multidimensional data structure;
map the at least one data set to at least one predetermined file format;
generate at least one standardized data set based on a result of the mapping, the at least one standardized data set corresponding to the at least one predetermined file format;
persist the at least one standardized data set in the networked repository;
expose the at least one standardized data set in the networked repository via the application programming interface;
retrieve, via the communication interface, at least one raw data set from at least one source, the at least one source including at least one from among a stream source and a batch source;
retrieve, via the communication interface, at least one predetermined configuration;
determine at least one feature value from the at least one raw data set based on the at least one predetermined configuration; and
persist the determined at least one feature value as the at least one data set in the networked repository.

11. The computing device of claim 10, wherein the at least one data set relates to at least one from among time-series based numerical data and sequence based numerical data.

12. The computing device of claim 10, wherein the at least one predetermined file format includes at least one from among an open standard file format and a data interchange file format that uses human-readable text to store and transmit data objects.

13. The computing device of claim 10, wherein the processor is further configured to expose the at least one standardized data set for consumption by a data reservoir application, the data reservoir application including a telemetry data service provider application that organizes information in the at least one standardized data set into at least one collection of related data.

14. The computing device of claim 10, wherein the processor is further configured to:
receive at least one previously generated standardized data set;
persist the at least one previously generated standardized data set in the networked repository;
receive at least one request that relates to the transformation of the previously generated standardized data set into a corresponding multidimensional data set; and
generate the corresponding multidimensional data set in response to the at least one request.

15. The computing device of claim 10, wherein the at least one predetermined configuration includes at least one definition from a feature registry.

16. The computing device of claim 10, wherein the processor is further configured to determine the at least one feature value in real-time based on the retrieved at least one raw data set.

17. The computing device of claim 10, wherein the processor is further configured to:
index the at least one standardized data set in the networked repository; and
categorize the indexed at least one standardized data set based on at least one characteristic.

18. The computing device of claim 17, wherein the categorized at least one standardized data set includes human-readable text that is searchable via at least one graphical user interface.

* * * * *